United States Patent
Matsui et al.

(10) Patent No.: US 9,495,565 B2
(45) Date of Patent: *Nov. 15, 2016

(54) INFORMATION BEARING MEDIUM AND INFORMATION PROCESSING SYSTEM

(71) Applicant: BANDAI CO., LTD., Tokyo (JP)

(72) Inventors: Hiroki Matsui, Tokyo (JP);
Shinnosuke Terai, Tokyo (JP);
Hirotaka Hatayama, Tokyo (JP);
Haruhisa Saito, Tokyo (JP)

(73) Assignee: BANDAI CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/285,187

(22) Filed: May 22, 2014

(65) Prior Publication Data

US 2015/0001286 A1 Jan. 1, 2015

(30) Foreign Application Priority Data

Jun. 28, 2013 (JP) .................. 2013-137161

(51) Int. Cl.
*G06K 7/04* (2006.01)
*G06K 19/06* (2006.01)
(Continued)

(52) U.S. Cl.
CPC .................. *G06K 7/047* (2013.01); *G06K 5/00* (2013.01); *G06K 7/0095* (2013.01); *G06K 19/047* (2013.01); *G06K 19/063* (2013.01);
(Continued)

(58) Field of Classification Search
CPC .. G06K 7/14; G06K 19/06037; G06K 7/015; G06K 7/10712; G06K 7/047; G06K 7/0095; G06K 5/00; G06K 19/063; G06K 19/047; G06K 19/06159; G06K 19/06046

USPC .................. 235/375, 437, 448, 490
See application file for complete search history.

(56) References Cited

U.S. PATENT DOCUMENTS 8,157,170 B2 4/2012 Nitta
2005/0185567 A1* 8/2005 Adelmann ............. B82Y 10/00
369/126

(Continued)

FOREIGN PATENT DOCUMENTS

CN 102682260 A 9/2012
EP 0439682 A2 8/1991
(Continued)

OTHER PUBLICATIONS

Japan Patent Office, Office Action for Application No. 2013-137161, Feb. 10, 2014, 4 pages, Japan.
(Continued)

*Primary Examiner* — Sonji Johnson
(74) *Attorney, Agent, or Firm* — Alston & Bird LLP

(57) ABSTRACT

An information processing system includes an information bearing medium and an information reading unit. The information bearing medium has a two-dimensional array of unit data zones. Marks are provided on some of the unit data zones so as to form a digital code. Mark patterns of any two Y-directional adjacent unit data zone strings based on the arrangement of marks in an X-direction differ from each other. The information reading unit generates a data string on the basis of a unit signal formed from a plurality of signals output from a group of detection units that detect the marks in synchronization and recognizes the digital code of the information bearing medium on the basis of a group of the data strings sequentially obtained from the array of the unit data zones.

9 Claims, 6 Drawing Sheets

(51) Int. Cl.
  *G06K 19/04*  (2006.01)
  *G06K 5/00*   (2006.01)
  *G06K 19/063* (2006.01)
  *G06K 7/00*   (2006.01)

(52) U.S. Cl.
  CPC ... *G06K19/06037* (2013.01); *G06K 19/06046* (2013.01); *G06K 19/06159* (2013.01)

(56) References Cited

U.S. PATENT DOCUMENTS

2010/0252632 A1  10/2010  Sowers et al.
2012/0234905 A1   9/2012  Lau et al.

FOREIGN PATENT DOCUMENTS

| JP | 07-134757 | 5/1995 |
|----|-----------|--------|
| JP | H07134757 A * | 5/1995 |
| JP | 2005-100014 A | 4/2005 |
| JP | 2010-221004 A | 10/2010 |
| TW | 200828137 A | 7/2008 |

OTHER PUBLICATIONS

Japan Patent Office, Office Action for Application No. 2013-137161, Mar. 25, 2014, 4 pages, Japan.
European Patent Office, Extended European Search Report for Application No. 14168170.0, Oct. 17, 2014, 7 pages, Germany.
Intellectual Property Office, Ministry of Economic Affairs, R.O.C., Office Action for Application No. 103109145, Jul. 27, 2015, 12 pages, Taiwan.

* cited by examiner

INFORMATION BEARING MEDIUM AND INFORMATION PROCESSING SYSTEM

CROSS REFERENCES TO RELATED APPLICATIONS

The present application claims priority to Japanese Patent Application No. 2013-137161 filed in the Japan Patent Office on Jun. 28, 2013, the entire contents of which are incorporated herein by reference.

BACKGROUND OF THE INVENTION

1. Field of the Invention

The present invention relates to an information bearing medium and an information processing system.

2. Description of the Related Art

Information bearing media that bear a plurality of identification information items usable in a game in the form of a corresponding concave-convex portion have been developed. When the information bearing medium is mounted in a mount unit of a game machine, switches provided in the mount unit read a concave-convex pattern on the basis of whether each of the switches is depressed by one of the concave-convex portions. In this manner, the game machine can acquire identification information corresponding to the concave-convex pattern (refer to, for example, Japanese Unexamined Patent Application Publication No. 2010-221004).

The concave-convex portion of the information bearing medium described in Japanese Unexamined Patent Application Publication No. 2010-221004 includes a data signal section and a synchronous signal section arranged in parallel. Each of the data signal section and the synchronous signal section is formed from a combination of concave portions and convex portions. If the information bearing medium is inserted into the game machine, each of the convex portions depresses one of the switches.

The synchronous signal section of the concave-convex portion of the information bearing medium described in Japanese Unexamined Patent Application Publication No. 2010-221004 indicates only the timing at which the convex portion of the data signal section depresses the switch. Accordingly, the synchronous signal section does not provide any effective information.

SUMMARY OF THE INVENTION

If the synchronous signal section can be removed and a second data signal section can be provided instead, the amount of information provided by the concave-convex portion can be increased. However, if a plurality of the convex portions are sequentially arranged, the border between the preceding convex portion and the following convex portion is indicated only by a switch being off. Accordingly, if the moving speed of the concave-convex portion relative to the switch is high, the preceding convex portion and the following convex portion may be mis-recognized as a single convex portion.

Accordingly, an embodiment of the present invention is an information bearing medium and an information processing system capable of relatively reducing the occurrence of mis-recognition of the coded information.

According to an embodiment of the present invention, an information bearing medium includes a media substrate and a plurality of unit data zones formed on the media substrate in an array having a first direction and a second direction that crosses the first direction. A mark is provided on each of some of the unit data zones in the array of the unit data zones so as to form a digital code. The array is formed from unit data zone strings each extending in the first direction, and mark patterns of any second-directional adjacent two of the unit data zone strings based on an arrangement of marks in the first direction differ from each other.

The unit data zone string can include at least one mark.

According to another embodiment of the present invention, an information bearing medium includes a media substrate and a plurality of unit data zones formed on the media substrate in an array having a first direction and a second direction that crosses the first direction. A mark is provided on each of some of the unit data zones in the array of the unit data zones so as to form a digital code. The array is formed from unit data zone strings each extending in the first direction, and a mark pattern of a beginning unit data zone string in the second direction based on the arrangement of marks in the first direction differs from each of the mark patterns of a terminal unit data zone string based on the arrangement of marks in the first direction and a direction opposite to the first direction.

The mark pattern of the unit data zone string other than the beginning unit data zone string and the terminal unit data zone string based on the arrangement of marks in the first direction can differ from the mark pattern of the terminal unit data zone string based on the arrangement of marks in the first direction.

The information bearing medium can further include a guided portion provided on the media substrate, the guided portion extending in the second direction.

The guided portion can be in the form of a groove, and the unit data zones can be formed in the groove.

The mark can be a convex portion formed on a surface of the media substrate.

According to still another embodiment of the present invention, an information processing system includes the above-described information bearing medium and an information reading unit configured to read a digital code formed in an array of the unit data zones of the information bearing medium. The information reading unit includes a mount unit that allows the information bearing medium to move relative thereto in the second direction and be mounted therein, a plurality of detection units that are provided in the mount unit so as to be arranged in a direction parallel to the first direction if the information bearing medium and that detect the marks provided on the unit data zones of the information bearing medium and output signals corresponding to a result of detection, and a processing unit that generates a data string on the basis of a unit signal formed from the plurality of signals output from the detection units in synchronization and recognizes the digital code on the basis of a group of the data strings sequentially obtained from the array of the unit data zones of the information bearing medium.

According to still another embodiment of the present invention, an information processing system includes the above-described information bearing medium and an information reading unit configured to read a digital code formed in an array of the unit data zones of the information bearing medium. The information reading unit includes a mount unit that allows the information bearing medium to move relative thereto in the second direction and be mounted therein, a plurality of detection units that are provided in the mount unit so as to be arranged in a direction parallel to the first direction if the information bearing medium and that detect the marks provided on the unit data zones of the information bearing medium and output signals corresponding to a result of detection, and a processing unit that generates a data string on the basis of a unit signal formed from the plurality of signals output from the detection units in synchronization and recognizes the digital code on the basis of a group of the data strings sequentially obtained from the array of the unit data zones of the information bearing medium. The mark pattern of the terminal unit data zone string of the information bearing medium based on the arrangement of marks in the first direction is a particular mark pattern. Upon detecting a particular data string obtained from the particular mark pattern, the processing unit performs a process to recognize the digital code. Upon detecting a reverse particular data string obtained from a reverse particular mark pattern generated by reversing the particular mark pattern in a direction opposite to the first direction, the processing unit performs an error process.

The information bearing medium can further include a guided portion that is provided on the media substrate and that extends in the second direction. The mount unit of the information reading unit can have a guiding portion that is to be engaged with the guided portion of the information bearing medium so as to guide movement of the information bearing medium relative to the mount unit in the second direction.

The guided portion of the information bearing medium can be in the form of a groove, and the guiding portion of the information reading unit can be in the form of a convex rib extending in a direction parallel to the second direction of the information bearing medium.

The mark of the information bearing medium can be a convex portion formed on a surface of the media substrate, and each of the detection units can be a switch depressed by the convex portion.

The information reading unit can further include an operating unit and a storage unit that stores operation data used for operating the operating unit in association with the digital code, and the processing unit of the information reading unit can read the operation data corresponding to the recognized digital code out of the storage unit and cause the operating unit to operate on the basis of the readout operation data.

The operating unit may be capable of outputting presentation including at least one of sound and light emission.

According to several embodiments of the present invention, the occurrence of mis-recognition of the stored information can be relatively reduced.

DESCRIPTION OF THE PREFERRED EMBODIMENTS

Figure 1:
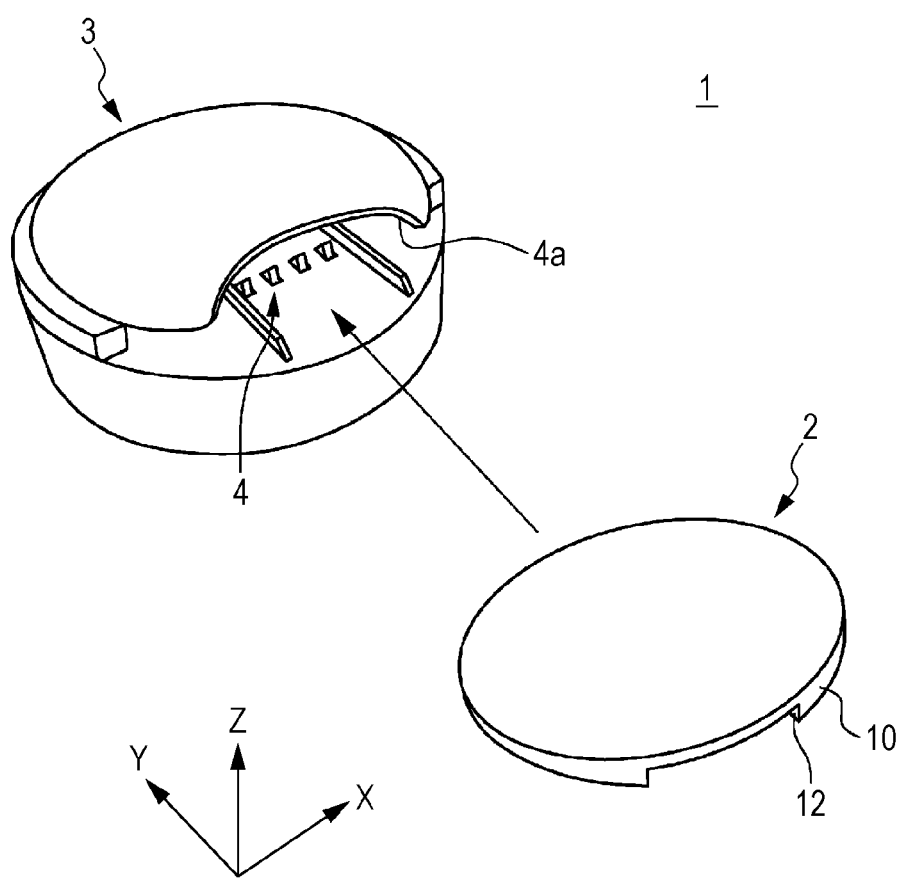
FIG. 1 illustrates the configuration of an example of an information processing system according to an exemplary embodiment of the present invention.

FIG. 1 illustrates the configuration of an example of an information processing system according to an exemplary embodiment of the present invention.

An information processing system 1 includes the information bearing medium 2 having digital code assigned thereto and an information reading unit 3 that reads the digital code assigned to the information bearing medium 2.

The information reading unit 3 includes a mount unit 4 that allows the information bearing medium 2 to be mounted therein. The mount unit 4 has an insertion port 4a that is open in a side surface of the information reading unit 3. The information bearing medium 2 is inserted into the mount unit 4 through the insertion port 4a and is mounted in the mount unit 4. Thereafter, the information reading unit 3 reads the digital code of the information bearing medium 2 mounted in the mount unit 4.

Figure 2:
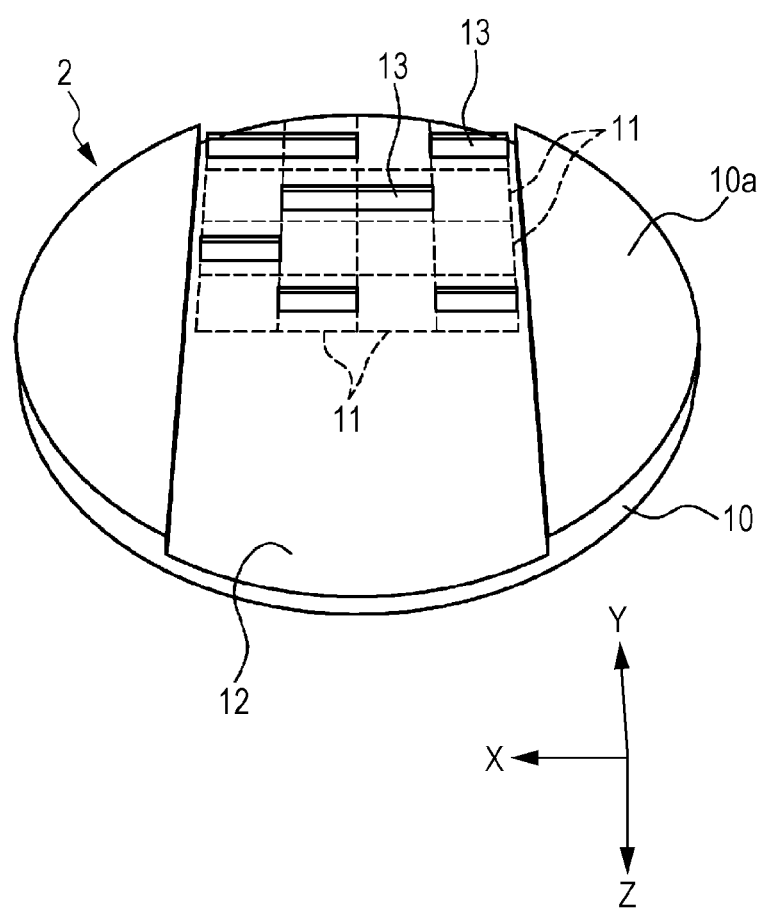
FIG. 2 illustrates the configuration of an information bearing medium illustrated in FIG. 1.

FIG. 2 illustrates the configuration of the information bearing medium 2.

The information bearing medium 2 includes a media substrate 10 and an array of unit data zones 11. The array of the unit data zones 11 represents the digital code. Note that although the media substrate 10 is a rigid plate-like member having a substantially circular shape in the example of FIG. 2, the shape and the material of the media substrate 10 are not limited thereto.

A back surface 10a of the media substrate 10 has a groove 12 formed therein. The groove 12 extends along any one of the diameters of the media substrate 10, and both ends of the groove 12 reach the side edge of the media substrate 10. The groove 12 regulates a direction in which the information bearing medium 2 is inserted into the mount unit 4 when the information bearing medium 2 is mounted in the information reading unit 3.

The array of the unit data zones 11 is provided on the bottom surface of the groove 12. The array of the unit data zones 11 is a two-dimensional array having a first direction and a second direction that is substantially perpendicular to the first direction. The second direction of the array of the unit data zones 11 is the same as the direction in which the groove 12 extends. In the example illustrated in FIG. 2, the array of the unit data zones 11 is a 4-by-4 array. However, the number of the unit data zones 11 in each of the first direction and the second direction is not limited thereto.

Hereinafter, the first direction of the array of the unit data zones 11 is referred to as an "X-direction", and the second direction is referred to as a "Y-direction".

Each of some of the unit data zones 11 has a mark 13 formed thereon. The marks 13 are used to form the digital code. In the example illustrated in FIG. 2, the mark 13 is configured in the form of a convex portion having a predetermined height. Binary data ("1" or "0") is assigned to each of the unit data zones 11 in accordance with the presence/absence of the mark 13. In this manner, the array of the unit data zones 11 represents digital code.

Figure 3A:
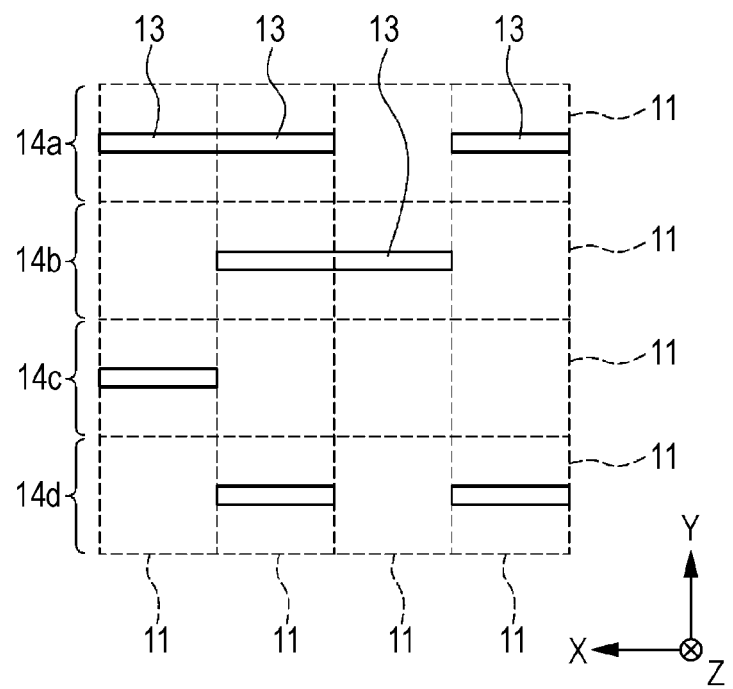
FIGS. 3A and 3B illustrate an example of a mark pattern formed in an array of unit data zones of the information bearing medium illustrated in FIG. 2.
Figure 3B:
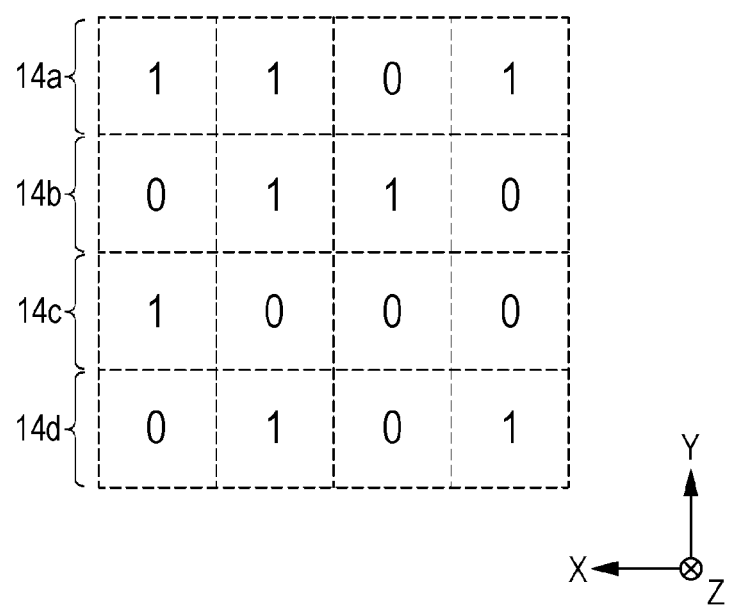

FIGS. 3A and 3B illustrate an example of a mark pattern formed by the array of the unit data zones 11. More specifically, FIG. 3A illustrates a mark pattern using the physical layout of the marks 13, and FIG. 3B illustrates the mark pattern using the digital code obtained by converting the presence/absence of the marks 13 into binary data "1" and "0".

Each of unit data zone strings 14a, 14b, 14c, and 14d formed from four unit data zones 11 arranged in the X-direction includes at least one mark 13.

In addition, the mark patterns of any Y-direction adjacent two of the unit data zone strings 14a, 14b, 14c, and 14d based on the arrangement of marks in the X-direction differ from each other. For example, the mark pattern of the unit data zone string 14a based on the arrangement of marks in X-direction is "mark, no-mark, mark, mark", and the corresponding data string is "1, 0, 1, 1", while the mark pattern of the unit data zone string 14b based on the arrangement of marks in X-direction is "no-mark, mark, mark, no-mark", and the corresponding data string is "0, 1, 1, 0". Thus, the two mark patterns differ from each other.

Furthermore, the mark pattern of the unit data zone string 14d located at one end of the unit data zone strings 14a, 14b, 14c, and 14d in the Y-direction based on the arrangement of marks in the X-direction is a particular mark pattern that is common to a plurality of types of digital code. The particular mark pattern and a corresponding data string indicate the terminal end of the digital codes formed in the array of the unit data zones 11. In the example illustrated in FIGS. 2A and 2B, the mark pattern of the unit data zone string 14d based on the arrangement of marks in the X-direction is "mark, no-mark, mark, no-mark", and a corresponding data string is "1, 0, 1, 0".

Hereinafter, the unit data zone string 14d located at one end is referred to as a "terminal unit data zone string", and the unit data zone string 14a located at the other end is referred to as a "beginning unit data zone string".

In addition, the mark pattern of the beginning unit data zone string 14a based on the arrangement of marks in the X-direction differs from each of the mark patterns of the terminal unit data zone string 14d based on the arrangements of marks in X-direction and the –X-direction.

Furthermore, the mark pattern of each of the unit data zone strings 14b and 14c based on the arrangement of marks in the X-direction differs from each of the mark patterns of the terminal unit data zone string 14d based on the arrangements of marks in the X-direction and the –X-direction.

The information bearing medium 2 is inserted into the insertion port 4a of the information reading unit 3 with the beginning unit data zone string 14a first and is mounted in the mount unit 4.

Figure 4:
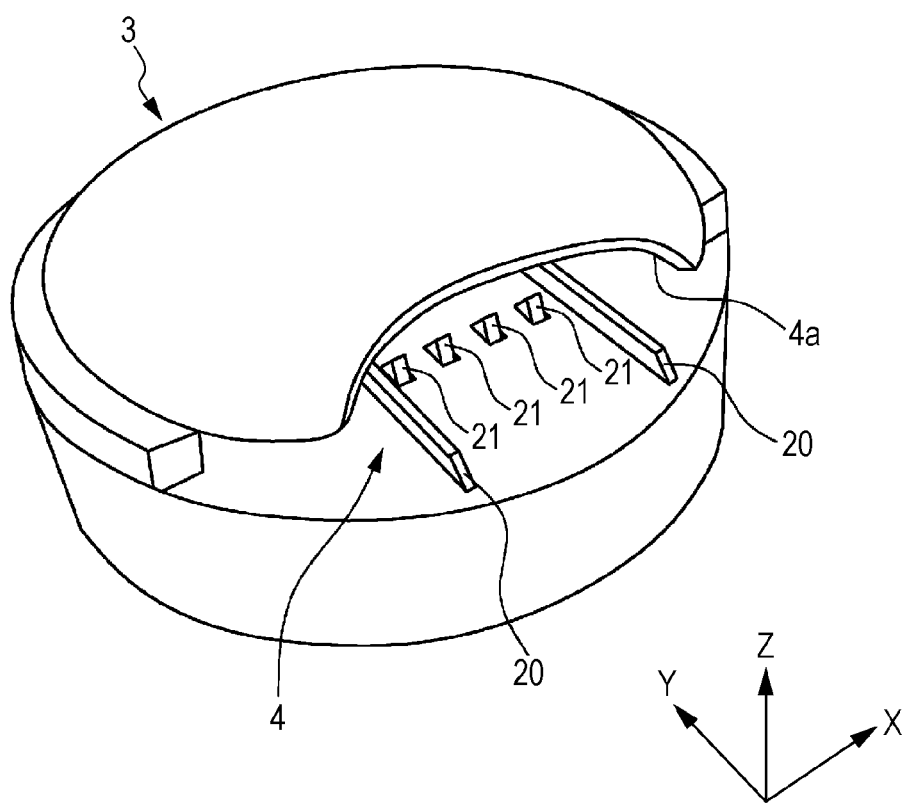
FIG. 4 illustrates the configuration of an information reading unit illustrated in FIG. 1.

FIG. 4 illustrates an exemplary configuration of the information reading unit 3.

The mount unit 4 of the information reading unit 3 has two convex ribs 20 formed thereon. The two convex ribs 20 are formed so as to extend in a direction parallel to the Y-direction of the array of the unit data zones 11 when the information bearing medium 2 is mounted in the mount unit 4. The convex ribs 20 are engaged with the two side surfaces of the groove 12 formed in the media substrate 10. Thus, a direction in which the information bearing medium 2 is inserted into the mount unit 4 is regulated to be the Y-direction.

In addition, the mount unit 4 includes the detection units 21 that detect the marks 13 formed in the array of the unit data zones 11 of the information bearing medium 2 and output a signal in accordance with the result of detection of the marks 13. The number of the detection units 21 is the same as the number of the unit data zones 11 that constitute one unit data zone string. The detection units 21 are arranged between the two convex ribs 20 in a direction that is parallel to the X-direction of the array of the unit data zones 11 when the information bearing medium 2 is mounted in the mount unit 4.

In the example illustrated in FIG. 4, the detection units 21 are configured to serve as switches that can be depressed by the marks 13. When the information bearing medium 2 is inserted into the mount unit 4 or is removed from the mount unit 4 and, thus, the marks 13 pass over the detection units 21, the detection units 21 are depressed by the marks 13. After the mark 13 pass by, the detection units 21 automatically rise. When being depressed, each of the detection units 21 outputs a signal of a High level. When the detection unit 21 stays at a raised position, the detection units 21 outputs a signal of a Low level.

When the information bearing medium 2 is inserted into the mount unit 4 or is removed from the mount unit 4, the unit data zone strings 14a, 14b, 14c, and 14d sequentially pass over the detection units 21 arranged in a line. Each time one of the unit data zone string passes over the detection units 21 arranged in a line, the signals are output from the set of the detection units 21 in synchronization.

Figure 5:
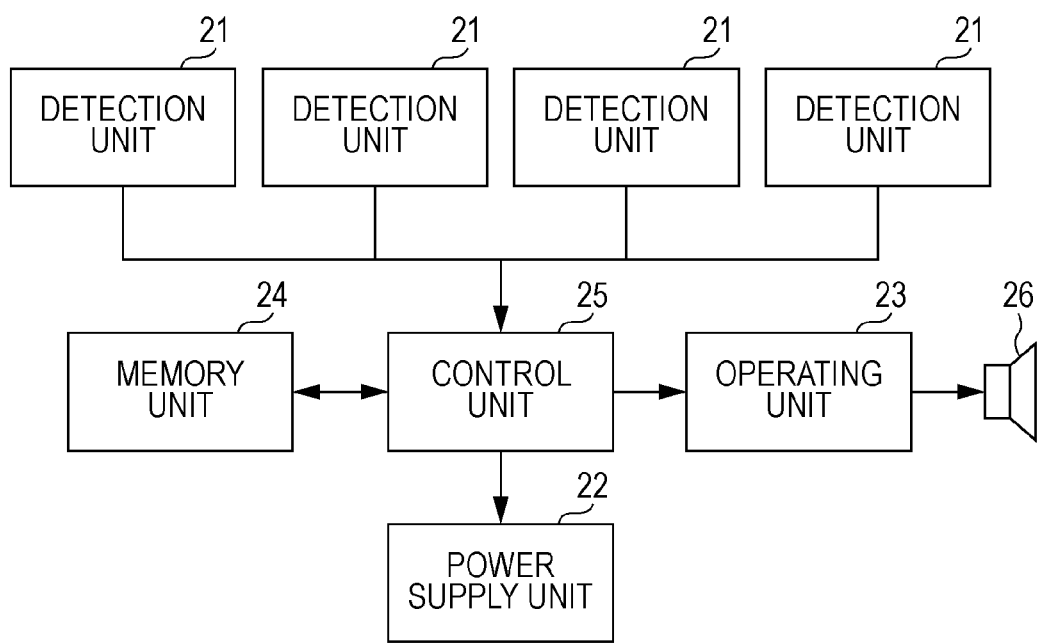
FIG. 5 is a functional block diagram of the information reading unit illustrated in FIG. 1.

FIG. 5 is a functional block diagram of an information reading unit 3.

The information reading unit 3 includes a processing unit that acquires a signal output from a group of the detection units 21, recognizes the digital code of the information bearing medium 2, and performs a variety of processes and a power supply unit 22 that supplies electricity to all the units of the information reading unit 3. In addition, the processing unit includes an operating unit 23, a memory unit 24, and a control unit 25.

The operating unit 23 is configured so as to be capable of outputting audio and visual presentation including at least one of sound and emission of light. In the example illustrated in FIG. 5, the operating unit 23 includes a speaker 26 so as to be capable of outputting representation based on sound.

Examples of the memory unit 24 include a storage medium, such as a read only memory (ROM) and a random access memory (RAM). Thus, the memory unit 24 stores, for example, a program executed by the control unit 25 and a table having a variety of digital codes assigned to the information bearing medium 2 in association with a variety of sound data items to be output to the operating unit 23.

The control unit 25 includes a processing unit (e.g., a microprocessor). Thus, the control unit 25 operates in accordance with the program stored in the memory unit 24 and performs overall control of the information reading unit 3.

The control unit 25 considers a group of signals output from a group of the detection units 21 in synchronization as one unit. Thereafter, the control unit 25 assigns digital data to each of the signals that constitute the unit signal group. By arranging the assigned digital data in accordance with the arrangement of the detection units 21 in the X-direction, the control unit 25 generates a data string.

In this example, each of the detection units 21 outputs a High-level signal when it is depressed by one of the marks 13. When the detection unit 21 stays in the raised position, the detection unit 21 outputs a Low-level signal. The control unit 25 detects the signal level of a signal output from the detection unit 21. If the signal level is High, the control unit 25 assigns data "1" to the signal level. However, the signal level is Low, the control unit 25 assigns data "0" to the signal level. Accordingly, if the mark pattern of the beginning unit data zone string 14a based on the arrangement of marks in the X-direction is "mark, no-mark, mark, mark", a data string "1, 0, 1, 1" is generated (refer to FIG. 3).

At that time, as described above, each of the unit data zone strings 14a, 14b, 14c, and 14d includes at least one mark 13. The mark patterns of any two adjacent unit data zone strings based on the arrangement of marks in the X-direction differ from each other. Accordingly, when the mark patterns of two adjacent unit data zone strings based on the arrangement of marks in the X-direction are detected by two group of the detection units 21, at least one of the signals output from the detection units 21 varies between the two adjacent unit data zone strings.

The control unit 25 detects switching of a signal output from at least one of the detection units 21. If a signal is switched, the control unit 25 acquires the signals output from the group of the detection units 21 in synchronization and generates a data string. In this manner, the control unit 25 can accurately recognize a border between adjacent two of the unit data zone strings 14a, 14b, 14c, and 14d without receiving any timing indication so as to acquire signals output from a group of the detection units 21 and, thus, generate a data string for each of the unit data zone strings.

The memory unit 24 reserves memory space for three data strings. The control unit 25 stores, in the memory space reserved in the memory unit 24, the data string sequentially acquired for each of the unit data zone strings when the information bearing medium 2 is inserted into the mount unit 4. For example, the information bearing medium 2 is inserted into the mount unit 4 with the beginning unit data zone string 14a first, three data strings sequentially acquired from the unit data zone strings 14a, 14b, and 14c are stored in the memory space reserved in the memory unit 24.

Subsequently, if the control unit 25 detects a data string "1, 0, 1, 0" corresponding to the particular mark pattern "mark, no-mark, mark, no-mark" of the terminal unit data zone string 14d based on the arrangement of marks in the X-direction, the control unit 25 recognizes the digital code on the basis of the data strings stored in the memory unit 24 and performs a process corresponding to the recognized digital code.

Hereinafter, the pattern of the data string "1, 0, 1, 0", which corresponds to the above-described particular mark pattern "mark, no-mark, mark, no-mark", is referred to as an "end data string pattern", and a mark pattern "no-mark, mark, no-mark, mark" obtained by reversing the particular mark pattern is referred to as an "reverse particular mark pattern". In addition, a pattern of the data string "0, 1, 0, 1" corresponding to the reverse particular mark pattern is referred to as an "reverse end data string pattern".

Figure 6:
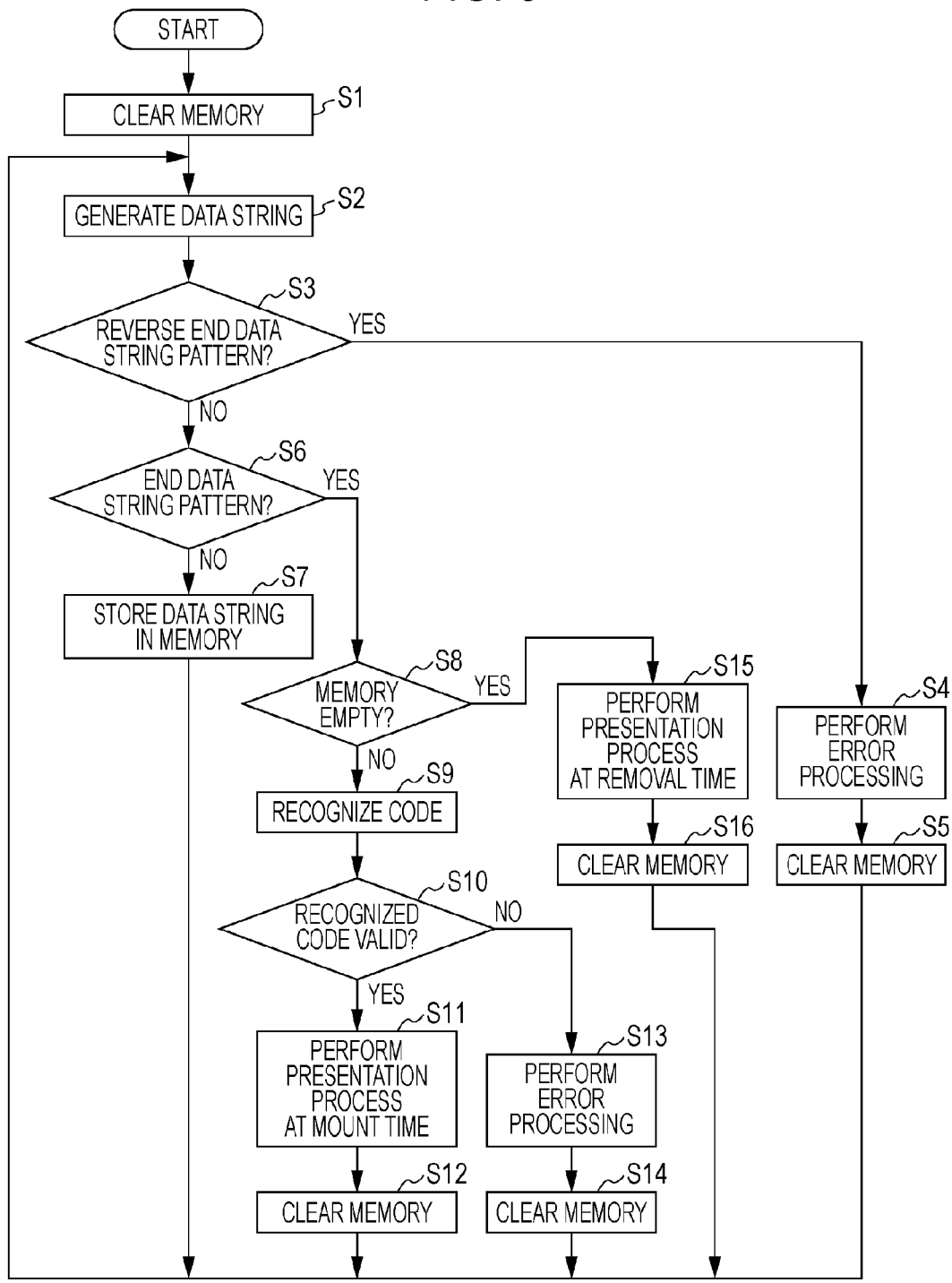
FIG. 6 illustrates the flow of a process performed by the information reading unit illustrated in FIG. 5.

FIG. 6 illustrates the flow of a process performed by the control unit 25.

If the information reading unit 3 is powered ON, the control unit 25 reserves memory space for three data strings in the memory unit 24 and clears data in the memory space (step S1).

If the information bearing medium 2 is inserted into the mount unit 4 or is removed from the mount unit 4, signals are output from a group of the detection units 21 that detect the mark pattern of each of the unit data zone strings. The control unit 25 acquires the signals output from the group of the detection units 21 and generates a data string (step S2).

Subsequently, the control unit 25 determines whether the data string matches the above-described reverse end data string pattern (step S3).

For example, if the information bearing medium 2 is inserted into the mount unit 4 with the beginning unit data zone string 14a first, the mark pattern of the beginning unit data zone string 14a based on the arrangement of marks in the X-direction is detected by the group of the detection units 21 first. The mark pattern differs from the above-described reverse particular mark pattern and, thus, the data string differs from the above-described reverse end data string pattern.

In contrast, if the information bearing medium 2 is inserted into the mount unit 4 with the terminal unit data zone string 14d first, the mark pattern of the terminal unit data zone string 14d based on the arrangement of marks in the X-direction is detected by the group of the detection units 21 first. The mark pattern matches the reverse particular mark pattern and, thus, the data string matches the reverse end data string pattern.

Accordingly, if the data string matches the reverse end data string pattern, the control unit 25 determines that the information bearing medium 2 is mounted in the mount unit 4 the other way around. Thus, the control unit 25 performs error processing (step S4) and clears the data in the memory space reserved in the memory unit 24 (step S5). Examples of the error processing include a process to activate the operating unit 23 on the basis of audio data, such as an error message, stored in the memory unit 24.

However, if the data string does not match the reverse end data string pattern, the control unit 25 determines whether the data string matches the above-described end data string pattern (step S6).

In addition, if the data string does not match the end data string pattern, the control unit 25 stores the data string in the memory space reserved in the memory unit 24 (step S7).

For example, if the information bearing medium 2 is inserted into the mount unit 4 with the beginning unit data zone string 14a first, the mark patterns of the unit data zone strings 14a, 14b, and 14c based on the arrangement of marks in the X-direction are sequentially detected by the group of the detection units 21. At that time, each of the mark patterns of the unit data zone strings 14a, 14b, and 14c based on the arrangement of marks in the X-direction differs from the particular mark pattern and, thus, each of the data strings obtained from the unit data zone strings 14a, 14b, and 14c differs from the end data string pattern. Accordingly, data strings sequentially obtained from the unit data zone strings 14a, 14b, and 14c are stored in the memory space reserved in the memory unit 24.

However, if the data string matches the end data string pattern, the control unit 25 determines whether the memory space reserved in the memory unit 24 is empty (step S8). If the memory space is not empty, that is, if a data string is stored in the memory space, the control unit 25 recognizes the digital code on the basis of the data string stored in the memory space (step S9). Thereafter, the control unit 25 determines whether the digital code is valid on the basis of whether the digital code is contained in a table stored in the memory unit 24 (step S10).

For example, when the information bearing medium 2 is inserted into the mount unit 4 with the beginning unit data zone string 14a first and, thus, the data strings sequentially obtained from the unit data zone strings 14a, 14b, and 14c are stored in the memory space reserved in the memory unit 24 and if mounting of the information bearing medium 2 in the mount unit 4 is completed, the end data string pattern is detected in the data string obtained from the terminal unit data zone string 14d. At that time, the data strings obtained from the unit data zone strings 14a, 14b, and 14c are stored in the memory space reserved in the memory unit 24. Thus, the digital code is recognized on the basis of these data strings. The digital code is contained in the table in the memory unit 24 as one of the digital codes assigned to the information bearing medium 2. Thus, the digital code is determined to be valid.

If the digital code is valid, the control unit 25 performs an audio and visual presentation process when the information bearing medium 2 is mounted in the mount unit 4. In the audio and visual presentation process, the control unit 25 reads, from the memory unit 24, audio data stored in association with the digital code and activates the operating unit 23 to operate on the basis of the read audio data (step S11). In addition, the control unit 25 clears the data in the memory space reserved in the memory unit 24 (step S12).

However, if the recognized digital code is not valid, the control unit 25 performs error processing (step S13) and clears the data in the memory space reserved in the memory unit 24 (step S14).

For example, the digital code is not valid if the information bearing medium 2 is moved back and forth during insertion of the information bearing medium 2 into the mount unit 4. At that time, the beginning unit data zone string 14*a* or the unit data zone string 14*b* are detected by the group of the detection units 21 a plurality of times and, thus, the data strings obtained from the beginning unit data zone string 14*a* and the unit data zone string 14*b* are duplicately stored in the memory space reserved in the memory unit 24.

If, after the information bearing medium 2 is mounted in the mount unit 4 and the presentation process at the time of mounting (step S11) or the error process (step S13) is performed, the information bearing medium 2 is removed from the mount unit 4, the mark pattern of the terminal unit data zone string 14*d* based on the arrangement of parks in the X-direction is detected by the group of the detection units 21 first. The end data string pattern is detected in the data string obtained from the terminal unit data zone string 14*d*. At that time, data in the memory space reserved in the memory unit 24 is cleared and, therefore, the memory space is empty (step S12 or S14).

As described above, when the data string matches the end data string pattern and if the memory space is empty, the control unit 25 performs a presentation process for removal of the information bearing medium 2 from the mount unit 4 (step S15) and clears data in the memory space reserved in the memory unit 24 (step S16). Examples of the presentation process for removal of the information bearing medium 2 includes a process to activate the operating unit 23 to operate on the basis of audio data, such as sound effects, stored in the memory unit 24.

Note that the above-described presentation process for removal of the information bearing medium 2 is also performed if the information bearing medium 2 is removed from the mount unit 4 after the information reading unit 3 is powered ON with the information bearing medium 2 mounted in the mount unit 4.

While the above embodiment has been described with reference to the information processing system 1 that has the marks 13 each formed from a convex portion having a predetermined height and that has binary data assigned to the unit data zones 11 of the information bearing medium 2 in accordance with the presence/absence of the marks 13, the data assigned to the unit data zone 11 is not limited to binary data. For example, by using marks having different heights, data with three or more values can be assigned to the unit data zone 11 in accordance with the presence/absence of the mark and the height of the mark. In addition, any mark 13 having a plurality of discrete values for a particular physical quantity can be employed. For example, by painting the unit data zones 11 with colors having different reflectance ratios, the marks 13 may be formed.

What is claimed is:

1. A non-transitory information bearing medium comprising:
    a media substrate; and
    a plurality of unit data zones formed on the media substrate in an array having a first direction and a second direction that crosses the first direction,
    wherein a mark is provided on each of some of the unit data zones in the array of the unit data zones so as to form a digital code,
    wherein the mark is a convex portion with a predetermined height formed on the surface of the media substrate, and the presence or absence of the convex portion provides for binary data for the unit data zones; and
    wherein the array is formed from unit data zone strings each extending in the first direction, and mark patterns of any second-directional adjacent two of the unit data zone strings based on an arrangement of marks in the first direction differ from each other.

2. The information bearing medium according to claim 1, wherein each of the unit data zone strings includes at least one mark.

3. The information bearing medium according to claim 1, further comprising:
    a guided portion provided on the media substrate, the guided portion extending in the second direction.

4. The information bearing medium according to claim 3, wherein the guided portion is in the form of a groove, and wherein the unit data zones are formed in the groove.

5. An information processing system comprising:
    the information bearing medium according to claim 1; and
    an information reading unit configured to read a digital code formed in an array of the unit data zones of the information bearing medium,
    wherein the information reading unit includes a mount unit that allows the information bearing medium to move relative thereto in the second direction and be mounted therein,
    a plurality of detection units that are provided in the mount unit so as to be arranged in a direction parallel to the first direction of the information bearing medium and that detect the marks provided on the unit data zones of the information bearing medium and output signals corresponding to a result of detection,
    a processing unit that generates a data string on the basis of a unit signal formed from the plurality of signals output from the detection units in synchronization and recognizes the digital code on the basis of a group of the data strings sequentially obtained from the array of the unit data zones of the information bearing medium, and
    wherein each of the detection units of the information reading unit comprises a switch configured to be depressed by the convex portion.

6. The information processing system according to claim 5, wherein the information bearing medium further includes a guided portion that is provided on the media substrate and that extends in the second direction, and
    wherein the mount unit of the information reading unit has a guiding portion that is to be engaged with the guided portion of the information bearing medium so as to guide movement of the information bearing medium relative to the mount unit in the second direction.

7. The information processing system according to claim 6, wherein the guided portion of the information bearing medium comprise a groove, and
    wherein the guiding portion of the information reading unit is in the form of a convex ridge extending in a direction parallel to the second direction of the information bearing medium.

8. The information processing system according to claim 5, wherein the information reading unit further includes an operating unit and a storage unit that stores operation data used for operating the operating unit in association with the digital code, and wherein the processing unit of the information reading unit reads the operation data corresponding to the recognized digital code out of the storage unit and causes the operating unit to operate on the basis of the readout operation data.

9. The information processing system according to claim 8, wherein the operating unit is capable of outputting presentation including at least one of sound and light emission.

* * * * *